US010623430B2

(12) United States Patent
Cao et al.

(10) Patent No.: US 10,623,430 B2
(45) Date of Patent: Apr. 14, 2020

(54) RISK AREA DETERMINATION IN COMMUNICATION NETWORK

(71) Applicant: INTERNATIONAL BUSINESS MACHINES CORPORATION, Armonk, NY (US)

(72) Inventors: Shuai Cao, Shanghai (CN); Yiping Qu, Shanghai (CN); Jian Jun Wang, Xi'An (CN); Yue Wang, Shanghai (CN); Chao Xing Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 15/811,969

(22) Filed: Nov. 14, 2017

(65) Prior Publication Data

US 2019/0149566 A1    May 16, 2019

(51) Int. Cl.
*G06F 11/00*    (2006.01)
*H04L 29/06*    (2006.01)
(Continued)

(52) U.S. Cl.
CPC ..... *H04L 63/1425* (2013.01); *H04W 12/00524* (2019.01); *H04W 12/08* (2013.01);
(Continued)

(58) Field of Classification Search
CPC ........ H04L 63/1425; H04W 12/00505; H04W 12/00503; H04W 12/1202; H04W 12/00524; H04W 84/12; H04W 12/08
(Continued)

(56) References Cited

U.S. PATENT DOCUMENTS

| 2007/0239876 A1* | 10/2007 | Chandra | H04L 61/2015 709/228 |
| 2014/0376385 A1* | 12/2014 | Boss | H04L 43/0811 370/242 |
| 2016/0309332 A1 | 10/2016 | Norrman et al. | |

FOREIGN PATENT DOCUMENTS

CN    103796241 A    5/2014
CN    104244253 A    12/2014
(Continued)

OTHER PUBLICATIONS

Li et al., "FBS-Radar: Uncovering Fake Base Stations at Scale in the Wild", NDSS '17, Feb. 26-Mar. 1, 2017, pp. 1-15.
(Continued)

*Primary Examiner* — Mohammad W Reza
(74) *Attorney, Agent, or Firm* — Michael A. Petrocelli

(57) ABSTRACT

Implementations of the present disclosure relate to methods, systems, and computer program products for determining a risk area in a communication network. In one implementation, a computer-implemented method is disclosed. According to the method, a local network may be determined in response to an abnormal state of a first device in accessing a communication network. State information may be received from at least one second device via the determined local network, where the state information includes a position and a connection state of the at least one second device in accessing the communication network. A risk area within which a device is unable to access the communication network may be determined based on the received state information. According to other implementations, a corresponding system and a corresponding computer program product are disclosed.

20 Claims, 8 Drawing Sheets

(51) Int. Cl.
*H04W 12/08* (2009.01)
*H04W 12/00* (2009.01)
*H04W 12/12* (2009.01)
*H04W 84/12* (2009.01)

(52) U.S. Cl.
CPC .. *H04W 12/1202* (2019.01); *H04W 12/00503* (2019.01); *H04W 12/00505* (2019.01); *H04W 84/12* (2013.01)

(58) Field of Classification Search
USPC .......................................................... 726/22
See application file for complete search history.

(56) References Cited

FOREIGN PATENT DOCUMENTS

| CN | 104244289 A | 12/2014 |
|---|---|---|
| CN | 104602241 A | 5/2015 |
| CN | 105357672 A | 2/2016 |
| CN | 105472620 A | 4/2016 |
| WO | 2016082483 A1 | 6/2016 |

OTHER PUBLICATIONS

Mell et al., "The NIST Definition of Cloud Computing", Recommendations of the National Institute of Standards and Technology, Special Publication 800-145, Sep. 2011, 7 pages.

Singh et al., "Detection of Rogue Base Station Using MATLAB", International Journal of Soft Computing and Engineering (IJSCE) ISSN: 2231-2307, vol. 1, Issue 5, Nov. 2011, pp. 198-201.

ELEMENT14, theknode, "Introduction to Zibgbee Technology", Ankur Tomar—Global Technology Centre, vol. 1, Jul. 2011, pp. 1-24.

\* cited by examiner

RISK AREA DETERMINATION IN COMMUNICATION NETWORK

BACKGROUND

The present disclosure generally relates to communication network management. Specifically, the present disclosure relates to methods, systems and computer program products for determining a risk area in the communication network.

With the rapid development of modern communication network, the coverage of the communication network becomes wider than ever. Users may use their mobile phones or other terminal devices to transmit and receive data via the communication network provided by telecommunication operators. In one situation, the appearance of spammers breaks normal orders of the communication network. The spammer may use a pseudo base station to disturb the authenticated base station within an area covered by the pseudo base station. The terminal devices are forced to disconnected from the authenticated base station and connect to the pseudo base station. Then, the pseudo base station may send malicious information to the terminal devices. In another situation, a blind area may not be covered by the authenticated base station and thus the terminal devices within the blind area cannot access the communication network.

SUMMARY

In one aspect, a computer-implemented method is disclosed. According to the method, a local network may be determined in response to an abnormal state of a first device in accessing a communication network. State information may be received from at least one second device via the determined local network, where the state information includes a position and a connection state of the at least one second device in accessing the communication network. A risk area within which a device is unable to access the communication network may be determined based on the received state information.

In another aspect, a computer-implemented system is disclosed. The computing system comprises a computer processor coupled to a computer-readable memory unit, where the memory unit comprises instructions that when executed by the computer processor implements a method. According to the method, a local network may be determined in response to an abnormal state of a first device in accessing a communication network. State information may be received from at least one second device via the determined local network, where the state information includes a position and a connection state of the at least one second device in accessing the communication network. A risk area within which a device is unable to access the communication network may be determined based on the received state information.

In another aspect, a computer program product is disclosed. The computer program product comprises a computer readable storage medium having program instructions embodied therewith. The program instructions is executable by an electronic device to cause the electronic device to: determine a local network in response to an abnormal state of a first device in accessing a communication network; receive state information from at least one second device via the determined local network, the state information including a position and a connection state of the at least one second device in accessing the communication network; and determine, based on the received state information, a risk area within which a device is unable to access the communication network.

It is to be understood that the summary is not intended to identify key or essential features of implementations of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals represent the same or similar elements.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
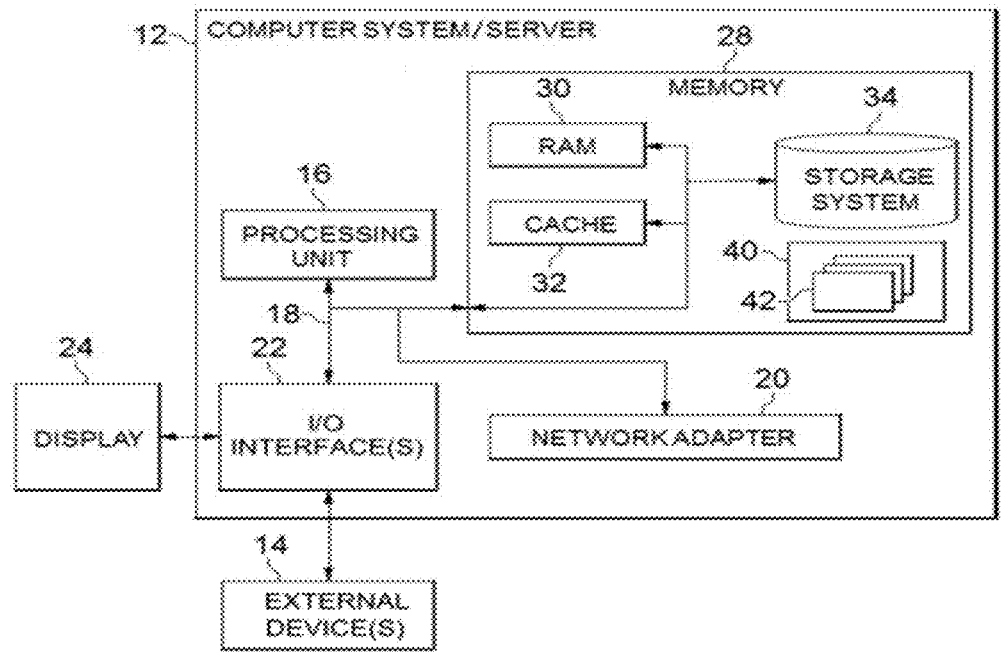
FIG. 1 shows an exemplary computer system which is applicable to implement the implementations of the present invention.

Referring now to FIG. 1, in which an exemplary computer system/server 12 which is applicable to implement the embodiments of the present invention is shown. FIG. 1 is also adapted to depict an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present disclosure, the area that is controlled by a pseudo base station and the blind area may be considered as risk areas. As the users cannot determine whether they are within the risk area and what is the coverage of the risk area, the only thing that they can do is to wait for a recovery in accessing the communication network.

For the purpose of description, detailed description will be provided to various implementations of the present disclosure in an environment where an area covered by a pseudo base station is taken as an example of the risk area. In another implementation, the risk area may be a blind area in the communication network. Alternatively, the disclosed implementation may also be applied to another type of environment, as long as there is a need to determining a risk area in the communication network. Further, various types of terminal devices such as the computer system/server 12 in FIG. 1 may implement the methods of the present disclosure. The terminal device may be a mobile phone, a smart phone, a personal digital assistant, a tablet, a laptop, and so on, as long as the terminal device may access the communication network supported by the communication operator. For simplicity, the terminal device may also be referred to as a device hereinafter.

Figure 2:
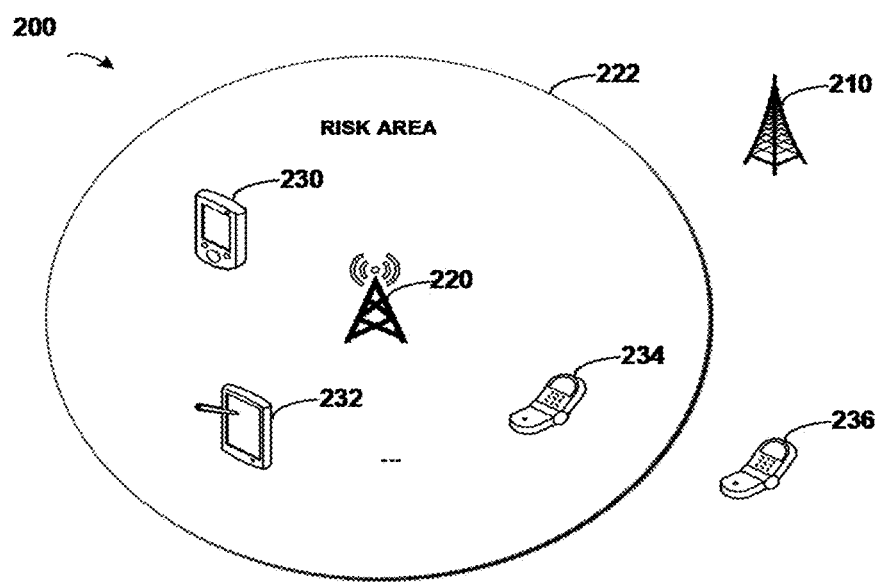
FIG. 2 shows an example diagram of a risk area that is covered by a pseudo base station in a communication network.

FIG. 2 shows an example diagram of a risk area 200 that is covered by a pseudo base station in a communication network. As shown in FIG. 2, a pseudo base station 220 appears in the coverage area of a base station 210 which is a base station authenticated by the operator of the communication network. The pseudo base station 220 may send a signal with very high energy that forces all the devices 230, 232, . . . and 234 nearby to disconnect from the authenticated base station 210 and connect to the pseudo base station 220. At this point, the coverage area of the pseudo base station 220 may be considered as a risk area 222 and the pseudo base station 220 may send spam messages to the devices 230, 232, . . . and 234. As the device 236 is far from the pseudo base station 220 and is external to the risk area 222, the device 236 may still connect to the authenticated base station 210 and work normally.

On one hand, a user of the device in the risk area 222 usually may not realize that it is forced to connect to the pseudo base station 220. Even if the user discovers that the device is kidnapped by the pseudo base station 220, he/she cannot know the boundary of the risk area 222 and how to leave the risk area 222. On another hand, even if the communication operator can detect that it has lost connections with the devices 230, 232, . . . , and 234, the communication operator cannot notify these devices of the potential risk because the communication network has already lost connections with the devices 230, 232, . . . , and 234.

In order to at least partially solve the above and other potential problems, a new method, system, and computer program product are disclosed for determining a risk area in a communication network. According to one implementation of the present disclosure, a computer-implemented method is disclosed. In the method, a local network may be determined in response to an abnormal state of a first device in accessing a communication network. State information may be received from at least one second device via the determined local network, where the state information includes a position and a connection state of the at least one second device in accessing the communication network. A risk area within which a device is unable to access the communication network may be determined based on the received state information. Reference will be made to FIGS. 3 to 8 to describe details of implementations of the present disclosure.

Architecture of Implementations

Figure 3:
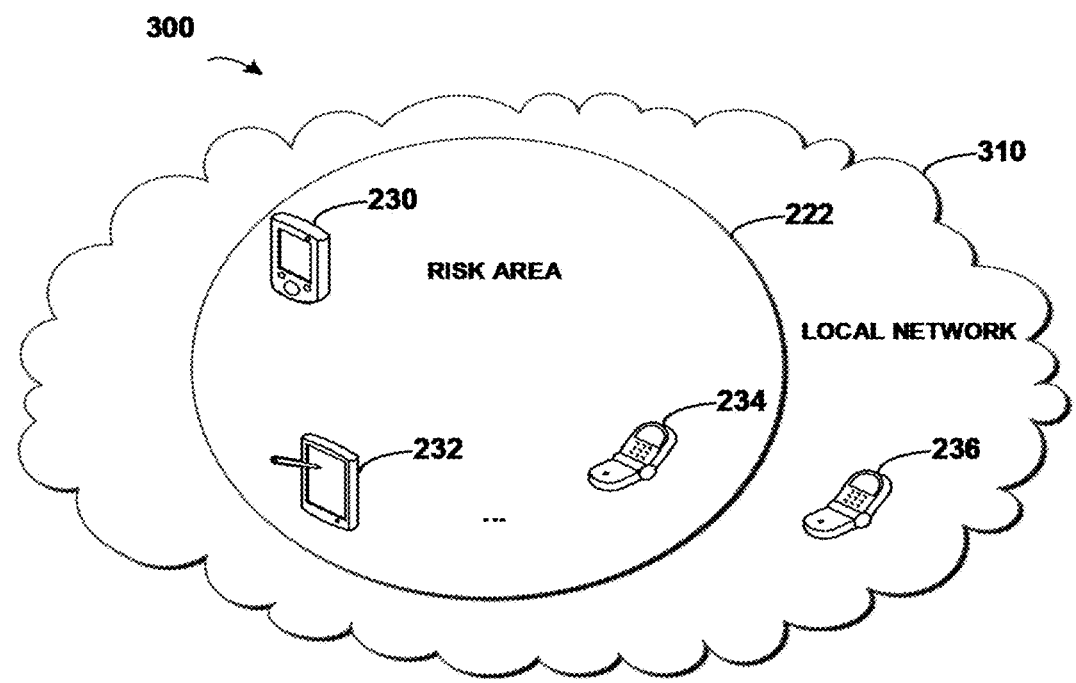
FIG. 3 shows an example diagram for determining a risk area according to one implementation of the present disclosure.

FIG. 3 shows an example diagram 300 for determining a risk area according to one implementation of the present disclosure. As shown in FIG. 3, the device 230 may determine a local network 310 (for example, based on a ZigBee® connection) once it detects an abnormal state in accessing the communication network. Then, the nearby devices 232, 234, . . . , and 236 may join the local network 310 and report the state information to the device 230. With the state information reported from the devices 232, 234, . . . , and 236, the device 230 may determine which device(s) can and which device(s) cannot access the communication network. Further, the risk area 222 may be determined based on the states of these devices 230, 232, 234, . . . , and 236.

As shown in FIG. 3 of the above implementation, the state information indicates that the devices 230, 232, . . . , and 234 are in abnormal states in accessing the communication network and the device 236 is in a normal state in accessing the communication network, then the risk area 222 may be determined based on the positions and the abnormal/normal connection states of these devices 230, 232, . . . , and 234, 236. In one example, an area that covers all the abnormal devices 230, 232, . . . , and 234 but excludes the normal device 236 may be determined as the risk area 222.

Workflow of Implementations

Figure 4:
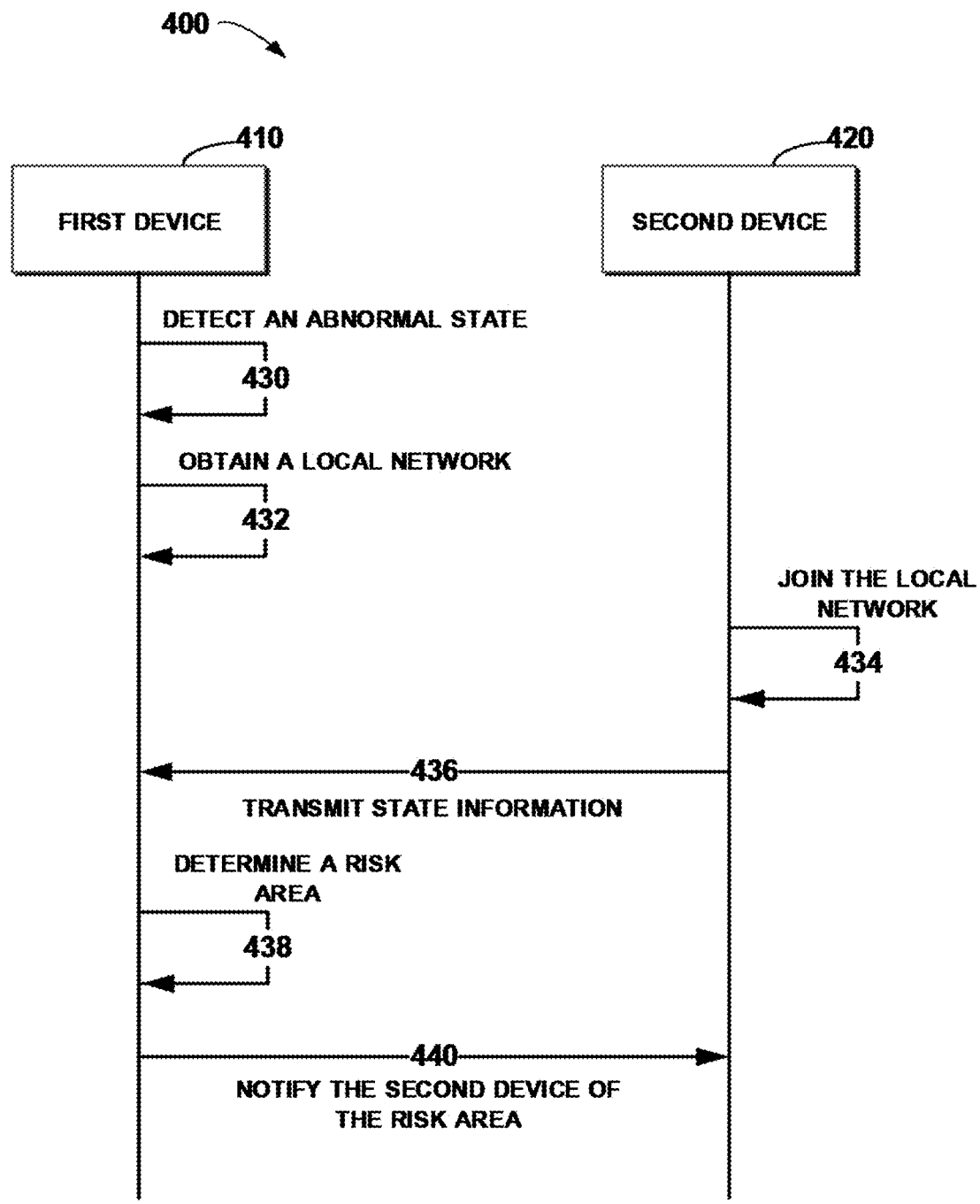
FIG. 4 shows an example diagram of interactions between two devices according to one implementation of the present disclosure.

Reference will be made to FIG. 4 for the detailed steps of the above procedure. FIG. 4 shows an example diagram 400 of interactions between two devices according to one implementation of the present disclosure. In FIG. 4, the devices may be referred to as a first device 410 and a second device 420 according to their roles in the local network 310. Specifically, the first device 410 may represent a device at a master side, such as the device 230 in FIG. 3 that detects the abnormal state and obtains the local network 310. The second device 420 may represent a device at a slave side, such as the devices 232, . . . , 234, and 236 that join the local network 310.

In one implementation of the present disclosure, in order to utilize a service for determining the risk area, specific applications may be installed on the first and second devices 410 and 420. Once the applications are installed, it means that the first and second devices 410 and 420 agree to trust each other and to share data such as positions, connection states, and the like. By using the applications, the first and second devices 410 and 420 may work in a master and a slave mode and utilize the service for determining the risk area.

As shown in FIG. 4, the first device 410 may detect 430 an abnormal state in accessing the communication network provided by the communication operator. Then the first device 410 may obtain 432 a local network 310. In this implementation, the first device 410 may generate the local network 310. Alternatively, the first device 410 may join an existing local network and managing the existing local by acting as the master of the existing local network. Here, the first device 410 may interact with the existing local network to obtain basic configurations of the existing local network.

Here, the configurations may define the rules for selecting a master (for example, a device with the most powerful computing ability may be the master). If the first device 410 is more powerful than devices in the existing local network, then the first device 410 may be selected as the master. Alternatively, the first device 410 may also work as a slave if an existing master is already selected in the existing local network and the first device 410 is not the most powerful one. In this situation, the existing master may be implemented by a terminal device, or it may be implemented by a device that is connected to the existing local network.

Once the local network 310 is obtained, the second device 420 may join 434 the local network 310. Here, in order to join the local network 310, data related to basic configurations of the local network 310, authentication for transmitting and receiving data via the local network 310, and other information may be exchanged between the first device 410 and the second device 420. Once an agreement is established between the two devices, the second device 420 may join the local network.

Although FIG. 4 illustrates the interactions between the first device 410 and only one second device 420, there may be one or more second devices 420 near the first device 410 and communicate with the first device 410.

The second device 420 may transmit 436 the state information including its position and connection state with the communication network. With the state information received from the second device 420, the first device 410 may determine 438 the risk area 222. Further, the first device 410 may notify 440 the second device 420 of the risk area, for example, by presenting a map of the risk area 222 or in another manner. With the map of the risk area 222, the user of the second device 420 may walk out of the risk area 222 and get rid of the negative influence of the pseudo base station 220.

With the implementations of the present disclosure, the users of the devices (including the first and second devices 410 and 420) that are within the risk area 222 may carry their devices away from the harmful pseudo base station 220 and access the regular communication network.

Implementations at Master Side

Figure 5:
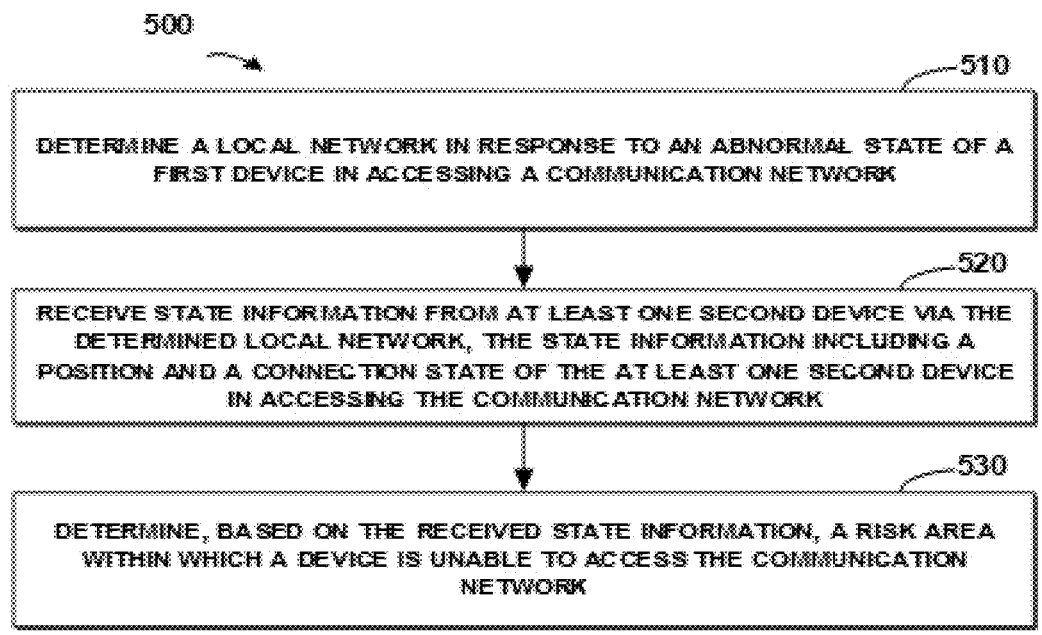
FIG. 5 shows an example flowchart of a method for determining a risk area according to one implementation of the present disclosure.

The above paragraphs have described the general concept of the implementations of the present disclosure, and reference will be made to FIG. 5 hereinafter to describe the details about the first device 410 at the master side. FIG. 5 shows an example flowchart of a method 500 for identifying a risk area according to one implementation of the present disclosure.

At a block 510, a local network may be determined in response to an abnormal state of a first device in accessing a communication network. Various methods may be adopted in determining whether the state is abnormal or normal. In some implementations of the present disclosure, the state may be determined as an abnormal state in accessing the communication network based on any of the following:

1) If the first device 410 is unable to access a network resource via the communication network, it may indicate that the connection between the device and the communication network has broken. Accordingly, the state may be considered as abnormal. 2) Once the first device 410 is disconnected from the communication network, the first device 410 cannot dial out via the communication network. Thereby whether the first device may dial out may indicate the abnormal/normal state of the first device. 3) If the first device 410 cannot send out a message (for example, a text message, a multimedia message, and so on) via the communication network, the state may be considered as abnormal. 4) Usually, during the operation of the pseudo base station 220, the pseudo base station 220 may work with a signal of very high energy. Accordingly, if a signal strength collected by the first device 410 is much higher than a normal strength of the communication network, it is reasonable to determine that the first device 410 is disconnected from the authenticated base station 210 and is connected to the pseudo base station 220. 5) A list including identifications of base stations that are authenticated by the communication operator may be provided. By querying the list, it may be determined that whether the first device is connected to an authenticated base station or not. If the first device is connected to a suspicious base station that is not an authenticated one in the list, the state may be identified as abnormal.

Although the above paragraph provides various methods for detecting the abnormal state, in another implementation, another method may be adopted for the detection as long as it may identify whether the state is normal or not.

After the abnormal state is determined, the local network 310 may be determined in various manners. In one implementation of the present disclosure, if it is determined that an existing local network is already generated in the nearby area, the first device 410 may join the existing local network and then take the existing local network as the local network 310. In one implementation of the present disclosure, if it is determined that no local network is generated in the nearby area, the first device 410 may generate the local network 310 by itself.

In one implementation of the present disclosure, in order to prevent the situation of multiple devices generating multiple local networks, conflict resolution rules may be defined. According to one rule, the first device 410 may wait for a predefined time period before the generating. The time period may be associated with attributes of the first device 410. In one example, the time period may be determined according to the Media Access Control (MAC) address of the first device 410. Specifically, the MAC address may be mapped to a time period with a specific value, for example, within a range between 0.1 second to 10 seconds. At this point, if two potential devices detect the abnormal states at the same time, due to the MAC addresses being different, the two potential devices will wait for different time periods before the generating. Accordingly, one device whose waiting time is shorter may generate the local network 310 and work as the master, and the other device may join the generated local network 310 as a slave so as to prevent a conflict.

According to another rule, the two potential devices may negotiate with each other before the generating. For example, the MAC addresses of the two devices may be compared to select one for generating the local network. At this point, the selected one may generate the local network and work as the master 310, and the other device may join the generated local network 310 as a slave so as to prevent a conflict. Although the above paragraphs describe the conflict resolution rules by taking the MAC address of the device as an example, in another implementation, the rules may be associated with the identification number or attributes of the device.

In one implementation of the present disclosure, the local network 310 may be an ad-hoc network, such as an ad-hoc network that is generated based on a ZigBee® connection. Once the states of the devices 230, 232, . . . , 234, and 236 turn into abnormal states, these devices cannot access the communication network and only short-distance protocol may be used for delivering data between these devices. As we know, the ZigBee® network may support up to 65535 nodes, and the distance between two nodes may reach 80 meters. Further, the ZigBee® network can reach the coverage of 12 kilometers, which is much greater than the 3 to 5 kilometers control area of a normal base station, the ZigBee® network is a candidate in generating the local network. Besides, the ZigBee® network may support both indoor and outdoor network, do not require to purchase a license cost, and consume less power, thereby the ZigBee® network may be a convenient and cheap choice for generating the local network 310.

At a block 520, state information may be received from at least one second device 420 via the determined local network 310, where the state information includes a position and a connection state of the at least one second device in accessing the communication network. At this point, the state information may be reported to the first device 410 from the at least one second devices 420. Here, the second devices 420 may include the device(s) that may access the communication network as well as the device(s) that cannot access the communication network.

Figure 6:
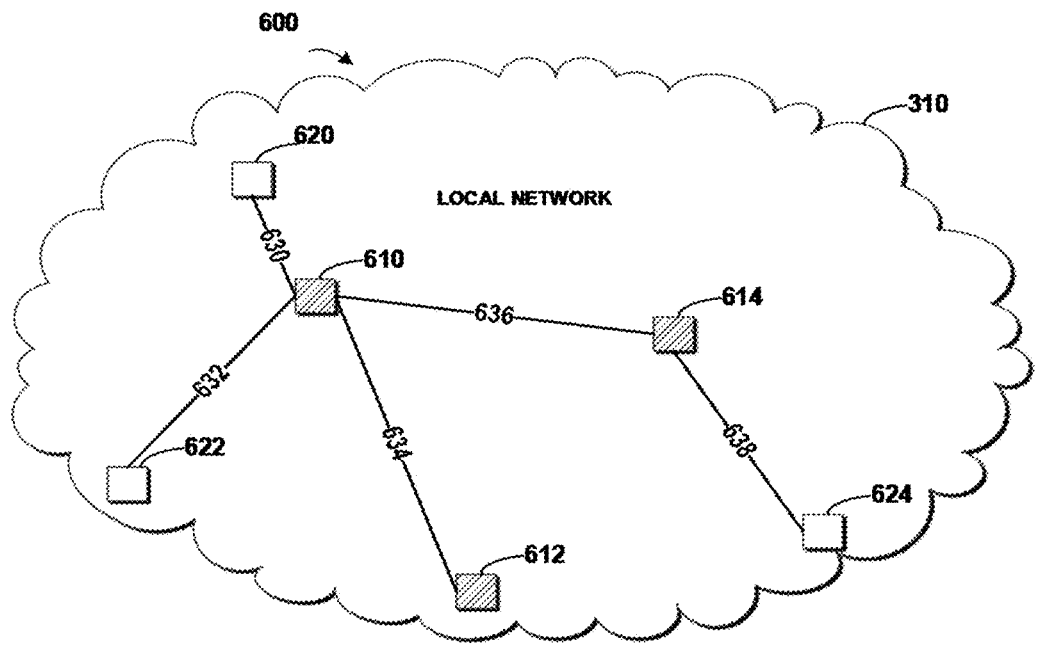
FIG. 6 shows an example diagram of a local network generated according to one implementation of the present disclosure.
Figure 7:
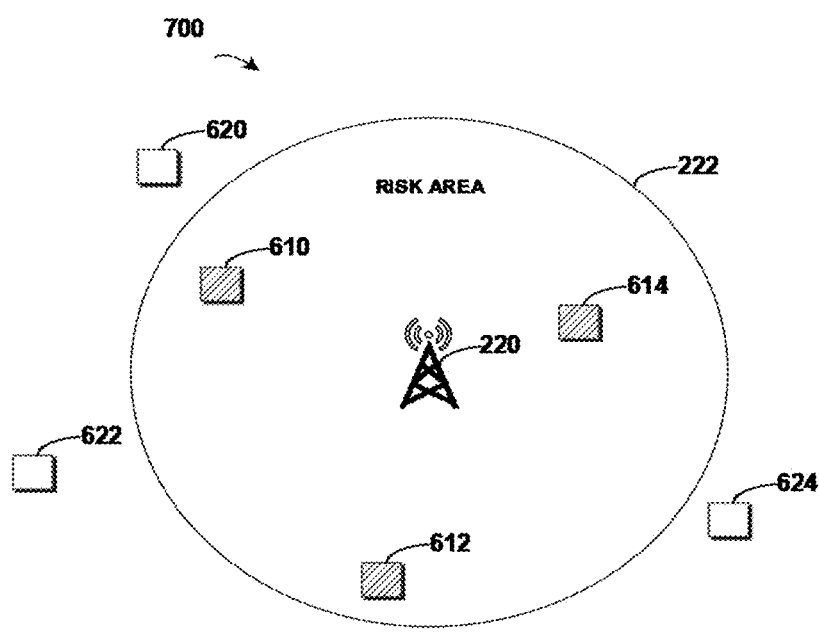
FIG. 7 shows an example diagram of a local network determined according to one implementation of the present disclosure.

At a block 530, a risk area 222 within which a device is unable to access the communication network may be determined based on the received state information. Based on the received state information, the first device 410 may determine the risk area 222. Specifically, the signal strength which may indicate a connection state to the communication network may be used in determining the risk area 222. Generally speaking, the position at which the signal of the communication network is strong enough may be excluded from the risk area 222, while the position at which a device cannot access the communication network may be included in the risk area 222. Reference will be made to FIGS. 6 and 7 to describe details of the implementation.

FIG. 6 shows an example diagram 600 of a local network 310 generated according to one implementation of the present disclosure. In FIG. 6, there are a plurality of devices 610, 612, 614, 620, 622, and 624, where the device 610 first detects the abnormal state in accessing the communication network. The device 610 may generate the local network 310 and act as the master. Further, the other devices 612, 614, 620, 622, and 624 may join the local network 310. The lines 630, 632, 634, 636 and 638 may indicate there a connection between the devices at two ends of the corresponding line. It is to be understood that, in the local network 310, it is not required that two devices should be directly connected. Alternatively, two devices may be indirectly connected. For example, the device 624 may be indirectly connected to the master device 610 via the device 614 as a relaying device.

As shown in FIG. 6, a signal distribution of the communication network may be determined according to the received state information, where the signal distribution may indicate an association between a position and a connection state of the communication network at the position. In FIG. 6, the positions and the blocks of the devices 610, 612, 614, 620, 622, and 624 illustrate the connection states. A shaded block indicates a device that cannot access the communication network, while a blank block indicates a device that can access the communication network. As the communication network cannot cover the positions of the devices 610, 612 and 614, these positions should be included in the risk area 222. Meanwhile, the devices 620, 622, and 624 can access the communication network and thus the positions of these devices should be excluded from the risk area 222.

Based on the obtained positions and the corresponding connection states as shown in FIG. 6, a boundary of the risk area 222 may be determined. Usually, a radiation area of the pseudo base station 220 is a circle, and thus a circle boundary of the risk area 222 may be determined. Reference will be made to FIG. 7 for illustration. FIG. 7 shows an example diagram 700 of a local network 310 determined according to one implementation of the present disclosure.

In one implementation of the present disclosure, the risk area may be determined based on an area that covering positions of the first device and a portion of the at least one second device whose connection state are abnormal. Specifically, if the connection state of at least one given second device of the at least one second device may be determined as normal, the position of the given second device and the position of an abnormal device with an abnormal connection state may be used to determine the boundary of the risk area 222. In the implementation, the abnormal device may be selected from the first device 410 and the at least one second device 420. In other words, the abnormal device may be selected from a group including the first device and a further second device(s) than the at least one given second device. In a simplified situation, if there is only one second device 420 and the connection state of the second device 420 is normal, then a perpendicular bisector of the line connecting the positions of the first and second devices 410 and 420 may be considered as the boundary.

In another situation, positions of a plurality of normal devices and a plurality of abnormal devices may be utilized to determine the risk area. For example, the positions of the shaded blocks 610, 612 and 614 in FIG. 7 may be used in estimating the position of the pseudo base station 220. Specifically, a center may be computed by averaging the coordinates of the positions of the shaded blocks, and then the center may be considered as the center of the risk area 222. Further, based on the positions of the center, a radius that separates the shaded blocks and the blank blocks may be determined. Thereby, the circle risk area 222 may be determined by the center and the radius.

There may be various ways to determine the radius. In one example, the radius as shown in FIG. 7 may be determined according to a geometry relationship between the position of the above devices 610, 612, 614, 620, 622, and 624. In one way, the radius may be gradually increased until a value that may cover most or all the shaded blocks in FIG. 7 is reached. Sometimes, a normal device may be mixed up with the abnormal devices (for example, being surrounded by the abnormal devices 610, 612, and 614). At this point, the position of the normal device may be neglected.

In another example, a conservative radius that may ensure a device is able to access to the communication network may be determined. For example, the radius may depend on the distance between the center and a position of the nearest device that can access the communication network. Referring to FIG. 7, as the device 620 is the nearest normal device that can access the communication network, the distance between the pseudo base station 220 at the center and the position of the device 620 may be determined as the radius. Here, although the conservative radius may be possibly greater than the real coverage of the pseudo base station 220, this conservative radius may ensure that the device outside the coverage of the conservative radius can access to the communication network normally.

In one implementation of the present disclosure, there is a possibility that none of the at least one second device can access the communication network. At this point, if a connection state of all of the at least one second device is abnormal, the boundary may be determined from an area that covers the positions of the first device 410 and the at least one second device 420. In this implementation, the boundary may be estimated as a circle that is large enough to cover the first device 410 and the at least one second device 420.

It is to be understood that, FIG. 7 is just an example for determining the risk area 222. In another implementation, more devices may join the local network 310 and the risk area 222 may be represented by another shape.

The above paragraphs have described how to determine the risk area 222, hereafter, how to inform users of the devices to leave the risk area 222 will be described. In one implementation, data about the risk area 222 may be transmitted to any of the first device 410 and the second device 420. In one example, a map of the risk area 222 may be transmitted to the second device 420. In another example, the coordinates describing the risk area 222 may be transmitted to the second device 420, and then the risk area 222 will be shown on a map that is loaded in the second device 420. In this example, the map may be provided by a navigation application installed in the second device 420.

In one situation, if the risk area 222 is determined at the first device 410, the risk area 222 may be transmitted from the first device 410 to the second device 420. In another situation, if the risk area 222 is determined at a given device other than the first and second devices 410 and 420, the risk area 222 may be transmitted from the given device to any of the first and second devices 410 and 420. It is appreciated that if there are multiple second devices with normal or abnormal states, the risk area 222 may be transmitted only to the abnormal devices (which refer to devices that are unable to access the communication network), so as to inform users of the abnormal devices to escape the risk area 222. Alternatively, the risk area 222 may be transmitted to the normal devices (which refer to devices that are able to access the communication network) as well, so as to alarm the users of the normal device not to enter the risk area 222.

Figure 8:
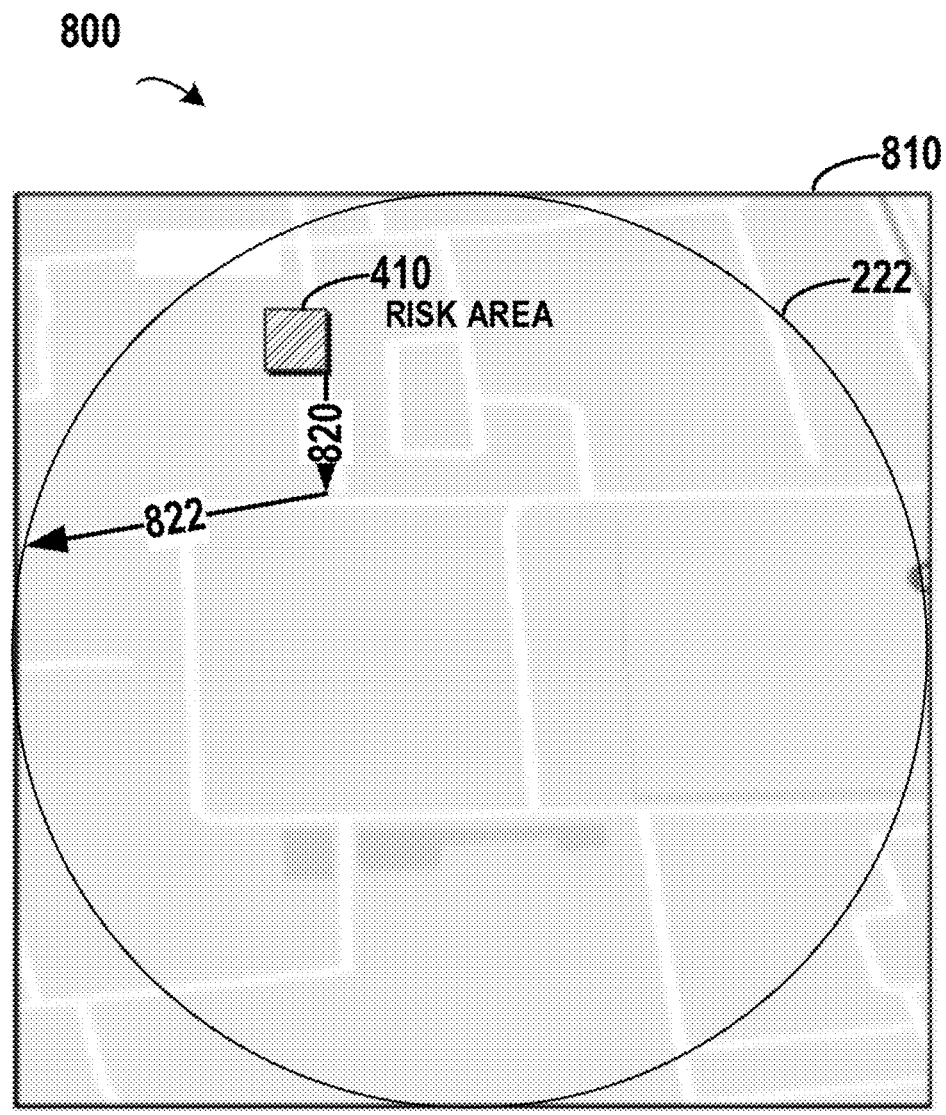
FIG. 8 shows an example diagram of generating a path for leaving the risk area according to one implementation of the present disclosure.

In the above implementation, the users of the first and second devices 410 and 420 may workout the path for leaving the risk area 222 by themselves. Alternatively, the path may be automatically determined by the first and second devices 410 and 420. FIG. 8 shows an example diagram 800 of generating a path for leaving the risk area according to one implementation of the present disclosure. As shown in FIG. 8, the geographic information 810 that is related to the risk area 222 may be used in determining the path. Specifically, the road information may be used in finding a way to escape from the risk area 222.

In FIG. 800, the first device 410 is inside the risk area 222 and the geographic information 810 indicates that a road may lead the user to leave the risk area 222. A path indicated by arrows 820 and 822 may be displayed on the first device 410. Guided by the path, the user of the first device 410 may leave the risk area 222 and access the communication network again. In one implementation, the first device 410 may determine and send a corresponding path to the second device 420. Alternatively, the first device 410 may sent data related to the risk area 222 to the second device 420 and then second device 420 may determine the corresponding path for leaving the risk area 222 by itself. Similar as transmitting the risk area 222, the path may be transmitted to any of the first device and the at least one second device.

It is to be understood that the role of the device may change during the running of the method. For example, the first device 410 may generate the local network 310 and work as the master, and at least one second device 420 may join the local network 310 and works as the slave. Sometimes, failures such as a power outage or a system crash may occur at the first device 410. At this point, another device may be elected from the at least one second device 420 to act as a new master. Further, the new master may implement the operations as described above.

Implementations at Slave Side

The above paragraph have described the implementations at the master side, hereinafter, implementations at the slave side will be described.

In one implementation of the present disclosure, a computer-implemented method is disclosed. In the method, if the second device 420 detects a local network 310, the second device 420 may join the local network 310. Then, the second device 420 may transmit its state information via the local network 310 to the first device 410. The second device 420 may start the transmission in response to a trigger such as a request from the first device 410 via the local network 310.

In one implementation of the present disclosure, the second device 420 may obtain a position and a state of itself. Then, the second device 420 may generate the state information based on the obtained position and the state.

In one implementation of the present disclosure, the state of the second device 420 may be determined as an abnormal state in response to any of: the second device 420 being unable to access a network resource; the second device 420 being unable to dial out; the second device 420 being unable to send out a message; a signal strength collected by the second device 420 being above a normal strength; or the second device 420 being connected to a base station that is not authenticated by an operator of the communication network.

In one implementation of the present disclosure, the second device 420 may receive the risk area 222 from the first device 410 via the local network 310, here the risk area 222 indicates an area within which a device is unable to access the communication network.

In one implementation of the present disclosure, the second device may generate a path for leaving the risk area 222 based on geographic information of the received risk area.

In one implementation of the present disclosure, the path may be displayed on the second device 420 to notify a user of the second device 420 to leave the risk area along the path.

In one implementation of the present disclosure, the local network is an ad-hoc network generated based on a ZigBee® connection.

Although the above paragraphs describe the implementations of the present disclosure by taking a method implemented at the second device 420 as an example, the present disclosure may be implemented by a device such as the second device 420.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
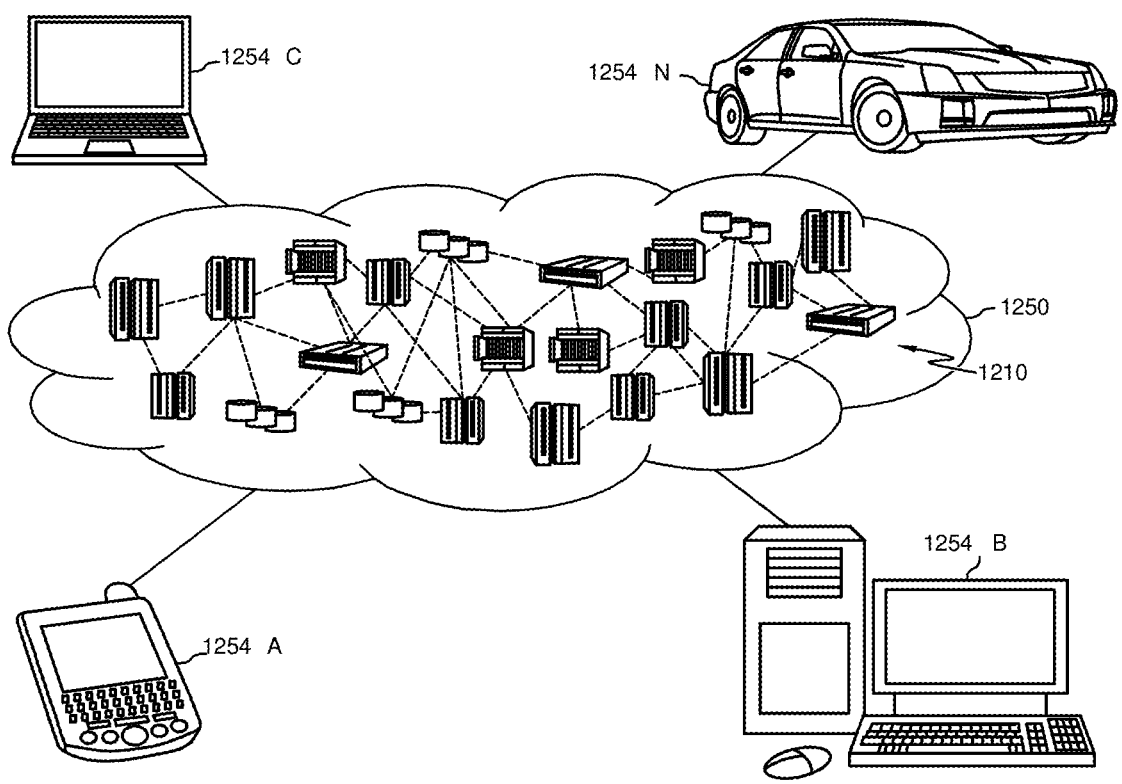
FIG. 9 is a functional block diagram depicting a cloud computing environment according to an embodiment of the present invention.

Referring now to FIG. 9, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 5 are intended to be illustrative only and that computing nodes 1210 and cloud computing environment 1250 can communicate with any type of computerized device over any type of network and/or network addressable connection (e.g., using a web browser).

Figure 10:
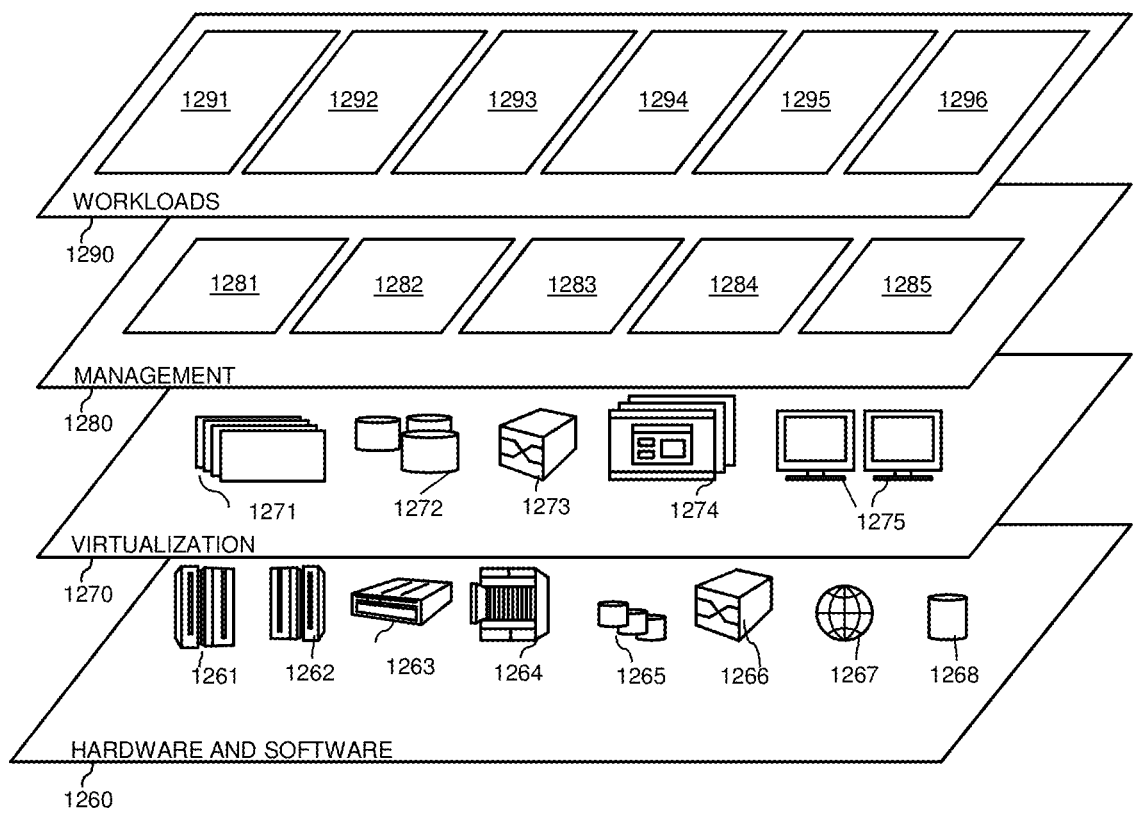
FIG. 10 is a diagram depicting abstraction model layers according to an embodiment of the present invention.

Referring now to FIG. 10, a set of functional abstraction layers provided by cloud computing environment 1250 (FIG. 9) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and determining a risk area within which a device is unable to access a communication network 1296.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    determining a connection of a first device to an ad-hoc local network in response to an abnormal state of the first device in accessing a communication network, the abnormal state including disconnection from the communication network and a forced connection to a pseudo base station generating a connection signal;
    receiving state information from at least one second device via the ad-hoc local network, the state information including a position and a connection state of the at least one second device in accessing the communication network; and
    determining, based on the received state information, a risk area controlled by the pseudo base station, within which the first device is unable to access the communication network.

2. The computer-implemented method of claim 1, wherein the determining the risk area comprises:
    in response to a connection state of the at least one second device being abnormal, determining the risk area based on an area that covering positions of the first device and the at least one second device.

3. The computer-implemented method of claim 1, further comprising:
    determining the abnormal state of the first device in response to any of:
        the first device being unable to access a network resource via the communication network;
        the first device being unable to dial out via the communication network;
        the first device being unable to send out a message via the communication network;
        a signal strength collected by the first device being above a normal strength of the communication network; or
        the first device being connected to a base station that is not authenticated by an operator of the communication network.

4. The computer-implemented method of claim 1, wherein the determining a local network comprises any of:
in response to detecting an existing local network, joining and managing the existing local network; or
in response to absence of an existing local network, generating the local network by the first device.

5. The computer-implemented method of claim 4, wherein the generating the local network comprises any of:
waiting for a predefined time period that is associated with the first device before generating the local network; or
in response to a success in a negotiation with a potential device that is to generate a potential local network, generating the local network.

6. The computer-implemented method of claim 1, further comprising:
transmitting the determined risk area to any of the at least one second device.

7. The computer-implemented method of claim 1, further comprising:
generating a path for leaving the risk area based on geographic information of the risk area; and
transmitting the generated path to any of the at least one second device.

8. A computer-implemented system, comprising a computer processor coupled to a computer-readable memory unit, the memory unit comprising instructions that when executed by the computer processor implements a method comprising:
determining a connection of a first device to an ad-hoc local network in response to an abnormal state of first device in accessing a communication network, the abnormal state including disconnection from the communication network and a forced connection to a pseudo base station generating a connection signal;
receiving state information from at least one second device via the ad-hoc local network, the state information including a position and a connection state of the at least one second device in accessing the communication network; and
determining, based on the received state information, a risk area controlled by the pseudo base station, within which the first device is unable to access the communication network.

9. The computer-implemented system of claim 8, wherein the determining the risk area comprises:
in response to a connection state of the at least one second device being abnormal, determining the risk area based on an area that covering positions of the first device and the at least one second device.

10. The computer-implemented system of claim 8, further comprising:
determining the abnormal state of the first device in response to any of:
the first device being unable to access a network resource via the communication network;
the first device being unable to dial out via the communication network;
the first device being unable to send out a message via the communication network;
a signal strength collected by the first device being above a normal strength of the communication network; or
the first device being connected to a base station that is not authenticated by an operator of the communication network.

11. The computer-implemented system of claim 8, wherein the determining a local network comprises any of:
in response to detecting an existing local network, joining and managing the existing local network; or
in response to absence of an existing local network, generating the local network by the first device.

12. The computer-implemented system of claim 11, wherein the generating the local network comprises any of:
waiting for a predefined time period that is associated with the first device before generating the local network; or
in response to a success in a negotiation with a potential device that is to generate a potential local network, generating the local network.

13. The computer-implemented system of claim 8, wherein the method further comprises:
transmitting the determined risk area to any of the at least one second device.

14. The computer-implemented system of claim 13, wherein the method further comprises:
generating a path for leaving the risk area based on geographic information of the risk area; and
transmitting the generated path to any of the at least one second device.

15. A computer program product, the computer program product comprising a computer readable storage medium having program instructions embodied therewith, the program instructions executable by an electronic device to cause the electronic device to:
determine a connection of a first device to an ad-hoc local network in response to an abnormal state of a first device in accessing a communication network, the abnormal state including disconnection from the communication network and a forced connection to a pseudo base station generating a connection signal;
receive state information from at least one second device via the ad-hoc local network, the state information including a position and a connection state of the at least one second device in accessing the communication network; and
determine, based on the received state information, a risk area controlled by the pseudo base station, within which the first device is unable to access the communication network.

16. The computer program product of claim 15, wherein the instructions further cause the electronic device to:
in response to a connection state of the at least one second device being abnormal, determining the risk area based on an area that covering positions of the first device and the at least one second device.

17. The computer program product of claim 15, wherein the instructions further cause the electronic device to: determine the abnormal state of the first device in response to any of:
the first device being unable to access a network resource via the communication network;
the first device being unable to dial out via the communication network;
the first device being unable to send out a message via the communication network;
a signal strength collected by the first device being above a normal strength of the communication network; or
the first device being connected to a base station that is not authenticated by an operator of the communication network.

18. The computer program product of claim 15, wherein the instructions further cause the electronic device to:

in response to detecting an existing local network, join and manage the existing local network; or in response to absence of an existing local network, generate the local network by the first device.

19. The computer program product of claim 15, wherein the instructions further cause the electronic device to:

wait for a predefined time period that is associated with the first device before generating the local network; or in response to a success in a negotiation with a potential device that is to generate a potential local network, generate the local network.

20. The computer program product of claim 15, wherein the instructions further cause the electronic device to:

transmit the determined risk area to any of the at least one second device.

* * * * *